United States Patent Office 3,418,071
Patented Dec. 24, 1968

3,418,071
METHOD FOR PRODUCING YTTRIUM
ALUMINATE CRYSTALS
Russell Seitz, Elberon, N.J. 07740
No Drawing. Filed Sept. 24, 1965, Ser. No. 490,125
2 Claims. (Cl. 23—22)

ABSTRACT OF THE DISCLOSURE $YAl_2O_4$ crystals are prepared under ambient conditions by supporting yttrium chloride and sodium aluminate solutions in contact with different portions of the surface of a silica gel and allowing the solutions to permeate the gel, and come into chemical contact at a common interface within the gel.

---

This invention relates to an improved and inexpensive method for producing a material used for doping laser crystals. More specifically, this invention relates to an improved method for the production of yttrium aluminate crystals at low temperatures under ordinary laboratory conditions.

Yttrium aluminate ($YAl_2O_4$) is presently produced in the laboratory under extreme or high temperature conditions employing a great deal of expensive laboratory equipment for processing and controlling the material as it is produced in its molten and crystalline state. It is therefore desirable to be able to produce yttrium aluminate in the laboratory under conditions not requiring elevated or high temperatures and expensive refractory equipment. According to the invention, it has been found that yttrium aluminate may be produced in the laboratory at room temperature by combining two soluble salts such as sodium aluminate and yttrium chloride in solution to permit the yttrium aluminate to precipitate out. However, this precipitation of the yttrium aluminate does not result in the formation of the crystalline material which would be desirable for use as a doping material in laser crystals. Therefore, according to the invention, a method is provided for controlling the combination of sodium aluminate with the yttrium chloride to form yttrium aluminate crystals at room temperatures. In the preferred embodiment of the invention, a silica gel is employed using sodium silicate in solution so that the gel may be used to control the combination of the soluble salts to produce the insoluble yttrium aluminate. The silica gel solution is, for example, added to a laboratory U-tube in sufficient amounts to almost fill both arms of the tube. Immediately above the silica gel in one arm of the U-tube, a water solution of sodium aluminate is added. A water solution of yttrium chloride is also inserted above the gel in the other arm. The solutions then descend and slowly permeate the silica gel in the U-tube and come together within the tube to form yttrium aluminate in crystalline form. It is also possible to add in the silica gel solution a crystallized yttrium aluminate seed at the approximate location near the chemical interface where the soluble solutions react so that the yttrium aluminate will grow onto the seeding crystal to form a single homogeneous crystal within the gel. Moreover, the portion of the U-tube containing the interface to which the chemical solutions react may be cooled in order to hasten the formation of the crystalline yttrium aluminate which is produced therein. The following represents the chemical reaction of the solutions at the interface of the U-tube:

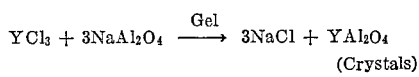

$$YCl_3 + 3NaAl_2O_4 \xrightarrow{Gel} 3NaCl + YAl_2O_4$$
(Crystals)

The sodium chloride which forms as a by-product of the above reaction during the formation of the yttrium aluminate crystals in the silica gel dissolves into the gel solution. It is not necessary that the yttrium aluminate crystals be grown in a U-tube but it is conceivable that any type of bath may be employed which is capable of containing the silica gel and maintaining a separation between the solutions of sodium aluminate and yttrium chloride so that they may permeate through the silica gel and form at the interface where the yttrium aluminate is chemically produced.

It is obvious that this method may be employed for the production of any insoluble bimetallic salt from a solution of two or more soluble salts. Thus, it is seen possible for yttrium aluminate or other bimetallic insoluble salts to be grown in crystalline form under controlled conditions at room temperatures using ordinary laboratory facilities without the need for elevated temperatures or expensive refractory controls. As indicated previously, techniques such as cooling the chemical interface within the silica gel where the bimetallic insoluble crystal is formed, and employing seeding crystals and the like, will aid in the growth of these crystals into any desired shape or configuration.

What I claim is:

1. A method for the production of $YAl_2O_4$ under ambient laboratory conditions in a silica gel comprising the steps of:
    supporting a solution of yttrium chloride in contact with a portion of the surface of the silica gel;
    supporting a solution of sodium aluminate in contact with another portion of the surface of the silica gel; and
    allowing the solutions of sodium aluminate and yttrium chloride to permeate through the gel through separate paths and come in contact at a common chemical interface so as to react to form $YAl_2O_4$ crystals.

2. The method as recited in claim 1, additionally comprising the step of cooling the silica gel at the chemical interfact to facilitate the rapid formation of the $YAl_2O_4$ crystals.

No references cited.

OSCAR R. VERTIZ, *Primary Examiner.*

H. T. CARTER, *Assistant Examiner.*

U.S. Cl. X.R.

23—52